Nov. 30, 1948. E. L. BECKWITH ET AL 2,455,215
PROCESS OF MAKING MOLDED SCABBARDS
Original Filed Oct. 7, 1941 2 Sheets-Sheet 1
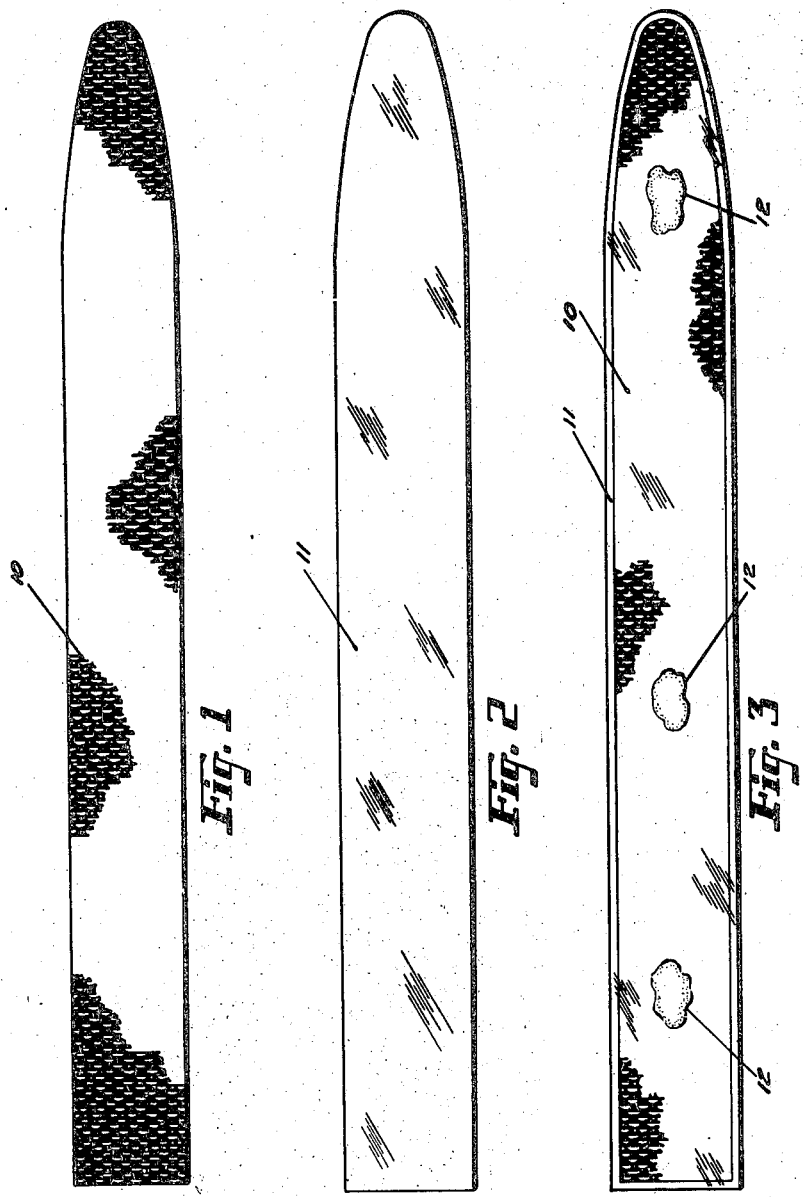
INVENTOR.

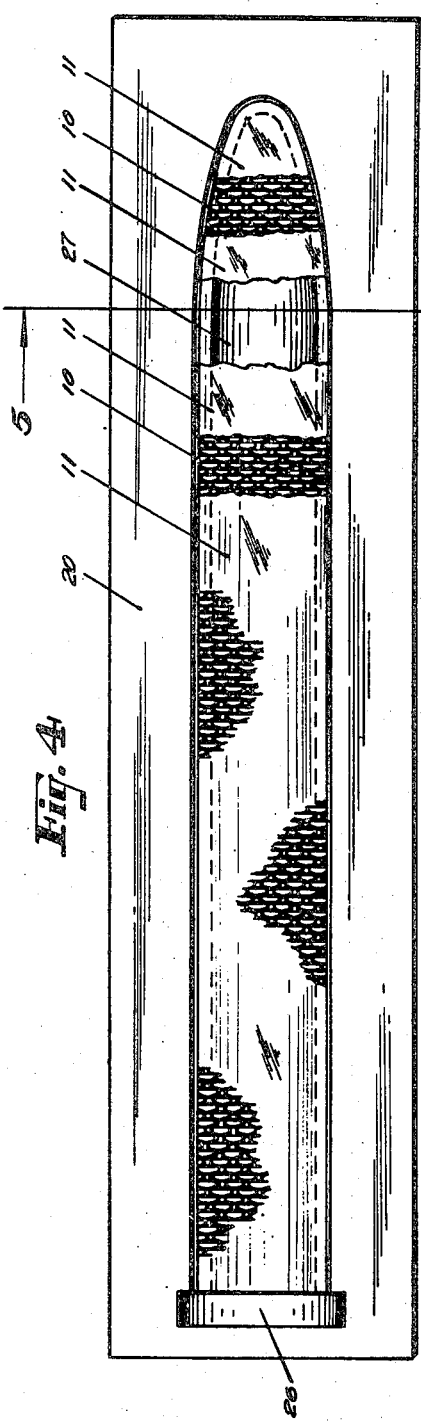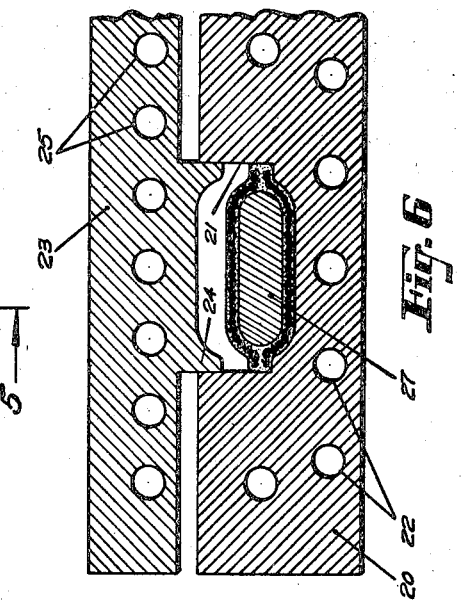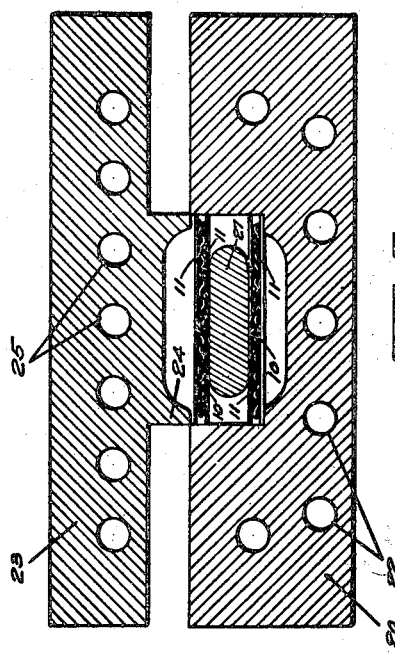

Patented Nov. 30, 1948

2,455,215

UNITED STATES PATENT OFFICE 2,455,215

PROCESS OF MAKING MOLDED SCABBARDS

Edwin L. Beckwith, West Newton, and Charles P. MacIver, Stow, Mass., assignors to Beckwith Manufacturing Company, Dover, N. H., a corporation of New Hampshire Continuation of application Serial No. 413,948, October 7, 1941. This application October 9, 1947, Serial No. 778,930

3 Claims. (Cl. 154—110)

This invention consists in a novel process of molding plastic articles including in their structure inserts of fabric or other non-plastic filler material. The invention includes within its scope the novel step-product herein shown as produced in carrying out our said process. The process is particularly useful in molding articles of substantial area in the manufacture of which it has been heretofore necessary to flow the plastic material substantial distances in the mold in order to bring about a uniform distribution of the material in the finished article.

In the art of molding plastics one of the difficulties incurred is the high viscosity of certain plastics when under the heat and pressure in the molds. This condition varies, naturally, from plastic to plastic, and where this difficulty is particularly met with, certain plastics are barred from consideration, due to the thin sections through which they would be obliged to flow. This condition is greatly aggravated where one wishes to introduce filler pieces or reinforcement pieces. Where it is desired to introduce such pieces, their volume in the mold must frequently be considerably reduced in order to allow flow passage for the plastic concerned, and even where such reduction is made, numerous rejects occur, due to the inability of the plastic to reach all parts of the mold. There is also, in many cases, great likelihood of the plastic shifting or displacing the filler piece from its predetermined position in the mold, thus destroying the designed structure, desired strength, and frequently marring the desired appearance, as in a case where the filler piece is forced against a wall of the mold and emerges in the finished article as an exposed surface.

The process of our invention has the advantage that the high viscosity and poor transposability of plastics, which in the present accepted practice of molding are a distinct handicap, is transformed into an aid, a benefit and an advantage in the molding art, whereby this tendency towards immobility of the plastic is used to hold the filler piece in position; thereby the filler pieces may be greatly enlarged, hence broadening the field of possible design, making possible more economical means of manufacture with consequent broadening of the field under which molded articles may be applied, from an economic point of view.

Our process has the further advantage that the greatly enlarged pieces are held in position through the viscosity of the plastic under molding conditions, and prevented from shifting sufficiently to disturb the formation of the given article.

It has been a problem of long standing to mold plastic articles of large area and relatively thin cross section because most plastics require at least $\frac{1}{16}''$ clearance to flow in the mold. In manufacturing scabbards and similar hard, stiff and resilient articles the filler insert may, for example, be canvas which substantially fills the mold cavity leaving only a relatively thin space of no more than film thickness available for plastic flow. Under these conditions it has heretofore been possible to use only plastics that have low viscosity or at least, it has been difficult to use other plastics in composite articles wherein the structure of the fabric blocks the flow. This limitation has barred the use of the more desirable thermoplastics, for example, cellulose acetate butyrate—"Lucite," polystyrene and the like. Again, any plastic flow in a mold under these conditions is likely to displace the canvas or other insert to an objectionable extent—to an extent whereby a fibrous internal member is buckled or misplaced as, for example, carried to the edge of the mold so that it is not uniformly enclosed in the finished article.

Thus, the use of a thermoplastic resin or compound requiring ample flow space such as acrylic resins, vinyl resins, ethyl cellulose, cellulose acetate butyrate, has been beset with limitations. Even if these resins be dissolved in a solvent to make them sufficiently liquid to use, this use of solvent is objectionable as involving an appreciable expense, and such thermoplastic materials as vinyl resin are very slow to give up solvent. The solvent vapor is entrapped and makes trouble in the form of blowing or blistering in the article. It is believed that thermoplastic resins, as distinguished from thermosetting resins, have never before been molded with a textile reinforcing insert to form stiff, resilient articles with concave walls.

The above difficulties are solved and advantageous results secured by our novel process which will now be illustrated in connection with the manufacture of bayonet scabbards such as for example, that shown in our Design Patent No. 128,614, dated August 5, 1941.

The fabric or fibrous member is pretreated in sheet form by giving it a very light coating or impregnation of solvent-solution of the thermoplastic compound to be used. This binds and impregnates the fibres and obviates ravelling so that blanks can be cut of the desired shape from sheet fabric or the like into predetermined required shape without fraying.

We then die out similar but slightly larger blanks from vinyl resin or other thermoplastic sheets of an order of .010 to .030" in thickness, the plastic sheets corresponding in shape but being slightly larger in contour than the fabric blanks. The fabric blanks are of a size to leave a slight marginal clearance in the mold, whereas the plastic sheets completely fill the mold.

To each side of the fabric blank we now apply one of the preshaped sheets of plastic. The amount of plastic thus brought into the process should aggregate enough to fill the mold with about 2% surplus. The plastic sheets may be attached to the canvas in any desired manner, as by spot heating and pressing, by cement or by wire clips. We thus pre-assemble the material into three-ply units with uniform superficial distribution of the plastic material before it is presented to the mold; that is, the distribution is made before the parts ever come to the mold and the relationship of plastic to fabric or filler is positively determined.

The molding operation now consists in welding, binding and forming the thermoplastic material under heat and pressure, forming integral solid ribs where the assembled blanks contact and a hollow space where they are separated by a mandrel or the like. It will be seen that in the molding pressure there is now no tendency to displace the plastic material in the mold. The fabric is prepositioned and held where it should be placed, and the plastic material is also prepositioned where it is wanted. Thus the molding operation is effective upon the material practically in situ. The plastic material may be of a highly viscous nature if desired, since it does not now have to flow any substantial distance in the mold. In fact, in the process of our invention, high viscosity of the thermoplastic material tends to hold the filler insert against displacement.

The fact that the fabric is cut narrower than the plastic sheets insures flow of the plastic material around the edges of the fabric blanks so that they are completely covered in the finished article.

On account of the accurate and uniform distribution of the plastic material, the amount supplied to the mold may be cut down to a minimum thus reducing the size of the flash which must be trimmed and reworked or discarded.

The process above outlined materially speeds up the time required for loading the molds and thus increases the production of the presses and the economy of production.

In place of a fabric member, such as canvas, felt, or flannel, we may employ a disunited fibrous filler such as cotton floc, wood flour and the like. Where these fibrous fillers are used with plastics of inherently high viscosity at plasticizing temperatures the same disadvantages that are discussed above have long been known to exist. By our preformation and prepositioning, however, the need for flow and migration is to a large extent removed and the advantages of lower cost of manufacture, faster production schedules and finer workmanship likewise are true.

Thus we are producing in effect a step-product comprising a three-ply unit in which an approximation of the finished article is achieved. The work involved in so doing is amply repaid in the thus-acquired ability to utilize thermoplastics of little inherent flow or migration. It is a fact, we believe that such thermoplastics are the most desirable from many points of view and that their usefulness has heretofore been proscribed by their inability to flow, especially when compounded or composited with fillers and when used in relatively large patterns or molds.

Furthermore, our novel pre-assembly unit allows us to make such articles as boxes of involved and intricate design. For example, panels of any desired shape and size may be spot-welded in approximately final desired relationship leaving merely the hot pressure work to be done and that with but little flow or migration of the plastic and filler.

Again, for the cheapest grade of articles it is desirable to dilute the relatively expensive plastic with the maximum tolerable filler such as wood flour. The amount of dilution has heretofore been limited by the flow of the plastic under heat and pressure and obviously the more filler the less flow. We now find that there is no limit but desired quality in the finished molded article since we practically eliminate flow as the controlling factor.

Our invention will be best understood and appreciated from the following description of its specific application to the manufacture of bayonet scabbards, as an illustration of its more general utility. In the accompanying drawings—

Fig. 1 is a plan view of the textile fabric blank,

Fig. 2 is a plan view of one of the thermoplastic blanks.

Fig. 3 is a plan view of the thermoplastic and fabric blanks assembled in a self-contained unit, Fig. 4 is a plan view of a molded scabbard, and mandrel lying in the molding die, with portions broken away, Fig. 5 is a view in cross section on the line 5—5 of Fig. 4 and showing also the cooperating top die and all parts in position preliminary to the molding operation, and Fig. 6 is a similar view showing the parts in position on the conclusion of the molding operation.

In the illustrative example of the process, the fabric blank is died from a heavy 22 or 24 oz. canvas or mill duck which has previously been coated in sheet form with a solution of vinyl resin in any appropriate solvent. Such a blank 10 is shown in Fig. 1. This may be cut or died by any suitable instrumentality and, as already noted, the coating or impregnation of the liquid thermoplastic material it has received holds the strands of the fabric in place and prevents fraying.

Blanks 11 of vinyl resin in sheet form are now cut or died out in thickness about .020". The sheet thermoplastic blanks are of the same shape as the fabric blank, but of slightly larger dimensions so that they may overlap each other about the margin of the textile blank symmetrically on all edges.

Two plastic blanks 11, which are smooth, stiff and resilient in nature, are now assembled with a single smaller fabric blank 10 interleaved between them as suggested in Fig. 3 and the three blanks are secured in assembled relation by subjecting them locally to heat and pressure thus forming a series of fused spots 12. The three-ply unit is a step-product of our process and such units may be manufactured in quantity. They may be stored or shipped as convenient in the manufacturing process and maintained in quantity at the molding station.

The units above described may be molded in producing scabbards by the molds shown in Figs. 4–6. The lower or concave mold 20 is provided with a cavity corresponding in outline to the outline of the assembled units as determined by the plastic blanks 11. The mold is provided with longitudinal passages 22 for steam by which the mold is heated preparatory to the molding operation or for water by which the mold is cooled at the conclusion of the molding operation. The upper mold 23 is similarly provided with longitudinal passages 25 and with a projecting mold portion 24 having a concave face corresponding to the concave lower face of the bottom mold 20. In connection with the molds 20 and 23 we employ a mandrel 27 having an enlarged flange or head 28, the body of the mandrel being shaped to determine the hollow interior of the scabbard.

In carrying out the process one of the three-ply units 10—11 is first placed in the bottom of the mold 20, its periphery substantially fitting and filling the cavity of the mold. The mandrel 27 is then placed upon the lowermost unit with its flange occupying a similar recess in the bottom mold, and then a second unit 10—11 is placed in the lower mold cavity above the mandrel. The various parts referred to are shown in this position in Fig. 5. By reference to Fig. 4 it will be apparent that we have assembled in the mold first a plastic blank 11, then a canvas blank 10, then a second plastic blank 11, then the mandrel 27, and above the mandrel a plastic blank 11, a second canvas blank 10 and finally a plastic blank 11. The two mold sections are now heated and brought together upon the enclosed material with molding pressure. Under pressure and heat the units 10—11 are fused together within the mold cavity and about the margin and tip of the mandrel 27 as indicated in Fig. 6. The edges of the units are curved over the rounded edges of the mandrel 27 and fused together in a heavy integral marginal rib which extends continuously from the open end of the scabbard and around the tip thereof. There is no lateral displacement of the blanks which are thus fixed permanently in multi-ply arrangement where they overlap about the margins of the scabbard. The fabric blanks are brought into substantial contact at their margins, but do not extend fully to the side walls of the mold cavity, being encased in plastic material from the overlapping margins of the plastic blanks 11. When molding pressure has been maintained sufficiently to effect the desired results and produce an integral scabbard, steam is cut off in the passage 22 and 25 and a cooling medium substituted. The molded article hardens while the fabric blanks are maintained under heavy molding pressure with the result that the compressed fabric is embedded or encased within a stiff shell of the hardened thermoplastic material. The scabbard and mandrel are then removed from the mold and the mandrel pulled out of the molded scabbard which is now ready to be finished by being provided with its necessary fittings. The molded scabbard is stiff and resilient and derives great strength from the strong and tough canvas insert which is held compressed within a complete envelope or shell of hard plastic material.

It will be noted that the composite three-ply units 10—11 may be placed in the mold rapidly, conveniently and with assurance that the thermoplastic material is distributed uniformly in the mold cavity and accurately confined to its approximate location in the finished article without the necessity for transverse flow.

The scabbard of our invention is the subject matter of our Patent No. 2,316,766, granted April 20, 1943, while the scabbard fittings above referred to are disclosed and claimed in our Patent No. 2,310,204, granted February 9, 1943.

Having thus disclosed our invention and described in detail an illustrative manner of practicing it and of the step-product produced therein, we claim as new and desire to secure by Letters Patent:

1. The process of molding scabbards from reinforced thermoplastic material, which includes the steps of assembling a pair of long narrow three-ply units, each comprising a fabric blank enclosed between two larger blanks of resinous thermoplastic sheet material which overlap each other along the side edges and beyond the end of the fabric blank, placing two of said units in spaced relation within a mold, molding the said units under heat and pressure upon a mandrel which terminates short of the end of the units, and thereby uniting the three-ply blanks and forming a rib of solid resinous plastic material about the side edges and closed end of the scabbard beyond the outline of the mandrel and extending outside the margins of the fabric embedded therein, and finally cooling the molded scabbard, thereby encasing the compressed fabric within a stiff shell of hardened thermoplastic material.

2. The process of molding scabbards from reinforced plastic material, which consists in enclosing an elongated canvas blank between sheets of vinyl resin, securing said blanks together in distributed areas to form a flat self-contained three-ply unit, placing a pair of said units in a mold separated in a central longitudinal area by a mandrel shorter than the blanks, then subjecting said units to heat and molding pressure about the mandrel, fusing their edges in a continuous integral rib including marginal portions of the canvas blanks and extending continuously about the sides and closed end of the scabbard, and finally cooling the mold thereby encasing the canvas blanks, with overlapping marginal portions, in compressed condition within a stiff shell of substantial thickness of hardened vinyl resin.

3. The process of molding scabbards from thermoplastic material, which consists in interleaving and fastening canvas blanks between sheet thermoplastic blanks of larger contour thus providing three-ply units, placing the units in a mold and at the same time separating the units in a central longitudinal zone by a mandrel which terminates short of the end of the units, then subjecting them to heat and pressure causing their marginal edge portions to fuse in an integral ribbed structure and the thermoplastic material to be molded into a hollow shell surrounding the superposed marginal edges of the fabric blanks and extending about the closed end as well as about the side edges of the scabbard, and finally cooling the molds, thereby encasing the compressed fabric in a stiff shell of hardened thermoplastic material.

EDWIN L. BECKWITH.
CHARLES P. MacIVER.

REFERENCES CITED

The following references are of record in the file of this patent:

UNITED STATES PATENTS

| Number | Name | Date |
|---|---|---|
| 1,062,725 | Mark | May 27, 1913 |
| 1,358,957 | Jelley | Nov. 16, 1920 |
| 1,607,964 | Patterson | Nov. 23, 1926 |
| 2,033,855 | Sloan | Mar. 10, 1936 |
| 2,054,870 | Stelkins | Sept. 22, 1936 |
| 2,061,934 | Mueller-Conradi et al. | Nov. 24, 1936 |
| 2,114,320 | Schneider | Apr. 19, 1938 |

FOREIGN PATENTS

| Number | Country | Date |
|---|---|---|
| 366,077 | Great Britain | Jan. 29, 1932 |
| 389,988 | Great Britain | Mar. 30, 1933 |